(12) United States Patent
Schippl

(10) Patent No.: US 6,186,181 B1
(45) Date of Patent: Feb. 13, 2001

(54) FLEXIBLE LINE PIPE

(75) Inventor: Klaus Schippl, Hannover (DE)

(73) Assignee: Alcatel, Paris (FR)

( * ) Notice: Under 35 U.S.C. 154(b), the term of this patent shall be extended for 0 days.

(21) Appl. No.: 09/295,371

(22) Filed: Apr. 21, 1999

(30) Foreign Application Priority Data

Apr. 23, 1998 (DE) .............................................. 198 18 167

(51) Int. Cl.$^7$ ....................................................... F16L 9/18
(52) U.S. Cl. ........................ 138/112; 138/121; 138/125; 138/127; 138/131; 138/149
(58) Field of Search .................... 138/149, 112, 138/114, 121, 122, 125, 127, 129, 131; 174/28, 29

(56) References Cited

U.S. PATENT DOCUMENTS

| | | | |
|---|---|---|---|
| 3,473,575 | * 10/1969 | Vogelsang et al. | 138/149 |
| 3,490,496 | * 1/1970 | Stearns | 138/112 |
| 3,565,118 | * 2/1971 | Stearns | 138/148 |
| 3,595,275 | * 7/1971 | Steans et al. | 138/114 |
| 3,727,029 | * 4/1973 | Chrow | 138/138 |
| 4,121,623 | * 10/1978 | Rhone | 138/149 |
| 4,259,990 | * 4/1981 | Rohner | 138/122 |
| 4,303,105 | * 12/1981 | Rohner | 138/149 |
| 4,492,089 | 1/1985 | Rohner et al. . | |
| 4,570,678 | * 2/1986 | Ziemek et al. | 138/149 |
| 4,570,679 | * 2/1986 | Schippl | 138/149 |
| 4,830,059 | * 5/1989 | Silberstang | 138/172 |
| 4,984,605 | * 1/1991 | Schippl | 138/149 |
| 5,394,904 | * 3/1995 | Winter et al. | 138/137 |
| 5,611,374 | * 3/1997 | Blin et al. | 138/121 |

FOREIGN PATENT DOCUMENTS

| | | |
|---|---|---|
| 19 01 069 | 9/1969 | (DE) . |
| 19 36 641 | 1/1970 | (DE) . |
| 19 36 609 | 2/1970 | (DE) . |
| 16 50 060 | 8/1970 | (DE) . |
| 21 61 839 | 6/1973 | (DE) . |
| 74 20 268 | 10/1974 | (DE) . |
| 75 34 809 | 2/1976 | (DE) . |
| 14 75 853 B2 | 5/1976 | (DE) . |
| 25 29 259 A1 | 1/1977 | (DE) . |
| 25 29 261 A1 | 1/1977 | (DE) . |
| 27 054 361 A1 | 8/1978 | (DE) . |
| 27 40 666 A1 | 3/1979 | (DE) . |
| 28 25 937 C2 | 1/1980 | (DE) . |
| 30 32 573 A1 | 4/1982 | (DE) . |
| 31 16 338 A1 | 11/1982 | (DE) . |
| 35 05 045 A1 | 8/1986 | (DE) . |
| 36 35 515 A1 | 4/1988 | (DE) . |
| 38 03 112 A1 | 8/1989 | (DE) . |

* cited by examiner

Primary Examiner—James Hook
(74) Attorney, Agent, or Firm—Sughrue, Mion, Zinn, Macpeak & Seas, PLLC

(57) ABSTRACT

In a flexible line pipe comprising an inner corrugated metal tube (4), an outer corrugated metal tube (5) located at some distance from the inner tube (4) and a spacer as well as an insulation material between the inner and the outer metal tubes, whereby a pressure that is less than atmospheric pressure prevails in the ring-shaped gap (6) between the tubes, the spacer comprises two cords (7, 8) made of fiber-reinforced plastic applied to the inner tube (4) and wrapped in opposite directions. The insulation material (9) is a fleece material, and the pressure in the ring-shaped gap is between $10^{-3}$ and $10^{-1}$ mbar.

8 Claims, 1 Drawing Sheet

FLEXIBLE LINE PIPE

This application is based on and claims the benefit of German Patent Application No. 198 18 167.1 filed Apr. 23, 1998, which is incorporated by reference herein.

1. Background of the Invention

This invention relates to a flexible line pipe as described in the introduction to claim 1.

For the offloading of intensely-cooled, liquefied natural gas from a delivery vessel to a transport vessel, a thermally insulated line pipe is required that is flexible and has good insulating characteristics at a temperature of approximately −160° C.

DE 25 29 259 A1 describes a line pipe for the transport of liquid or gaseous cooled media between two movable objects floating on the ocean, in which one or more thermally insulated pipelines are oriented parallel to a carrier cable. Fastened to the carrier cable are weighting elements that ensure that the pipeline connects the two objects to one another. In this case, the thermally insulated pipeline consists of two concentric corrugated metal tubes, between which there is a thermal insulation layer based on polyurethane foam.

Apart from the fact that this type of tube is complicated and expensive, it has been shown that the polyurethane foam used as insulation becomes brittle at temperatures below −120° C. and crumbles when the tube system bends, thereby losing a major portion of its insulating properties.

U.S. Pat. No. 4,984,605 A describes a pipeline for intensely-cooled media that consists of two concentric corrugated metal tubes, between which there is an insulation layer. A spiral-shaped spacer lies on the inner tube, and a super-insulation layer is wrapped around the spacer so that a ring-shaped gap remains between the super-insulation layer and the inner tube. The term "super-insulation" is used in technical circles to mean a structure that consists of alternating layers of metal films and films of fleece. The purpose of the ring-shaped gap is to accelerate the evacuation process, in particular in long conduits and pipelines.

The line pipe of the prior art is used for the transport of liquid nitrogen, helium and oxygen. It is very expensive to manufacture because, in spite of the measures adopted, the evacuation process is difficult and time-consuming on account of the high degree of evacuation required.

SUMMARY OF THE INVENTION

The object of the invention is, therefore, to create a line pipe that is flexible and can be manufactured in long lengths and can also be used at temperatures below −100° C. without any loss of its thermal insulating characteristics.

The invention teaches that this object can be accomplished by the features disclosed in the characterizing portion of claim 1.

The essential advantage of the invention is that the cords wrapped in opposite directions provide good insulation because the contact between them is essentially a spot contact, and the selection of material also ensure a piping system that is stable when bent and has a high vibration fatigue limit.

The fleece material applied in the form of a strip fills up to 90% of the space between the inner and the outer tubes, as a result of which the vacuum can be set to a value between $10^{-1}$ and $10^{-3}$ mbar, because the thermal transmission by convection is reduced on account of the filling of the spaces. The amount of heat admitted into the piping system claimed by the invention is higher than with a conventional high vacuum insulation using super-insulation films, but is much lower than with foam insulation systems.

The costs for the line pipe claimed by the invention are significantly lower than the costs of pipes with conventional high vacuum insulation, but are only insignificantly higher than for a foam insulation.

Additional advantageous configurations of the invention are described in the subclaims.

BRIEF DESCRIPTION OF THE DRAWING

The invention is explained in greater detail below with reference to the exemplary embodiments illustrated schematically in FIGS. 1 and 2.

DETAILED DESCRIPTION OF THE INVENTION

Figure 1:
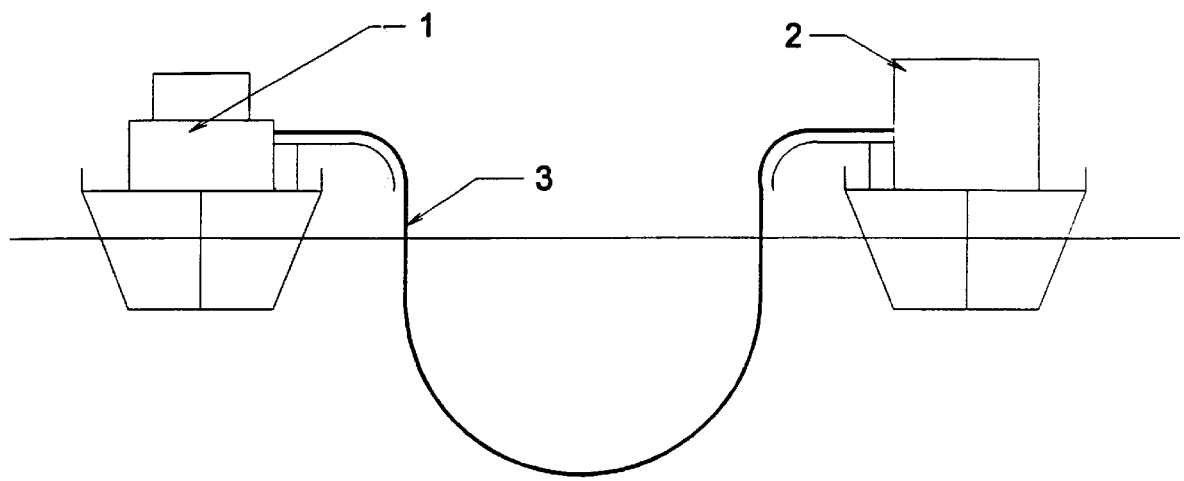

FIG. 1 shows a ship 1 that is firmly anchored and acts as a delivery vessel. By means of the delivery vessel 1, the natural gas is generally transported in the form of a gas and is converted into liquefied natural gas by lowering the temperature. The liquefaction of the natural gas is essential for reasons of transport technology and safety. The liquefied natural gas is transported to the sites where it will be used by a transport vessel 2.

To make it possible to load the transport ship even in high seas, the connecting line 3 between the vessels 1 and 2 must be able to follow the relative movements of the vessels 1 and 2. The connecting line 3 must also have very good thermal insulation.

Figure 2:
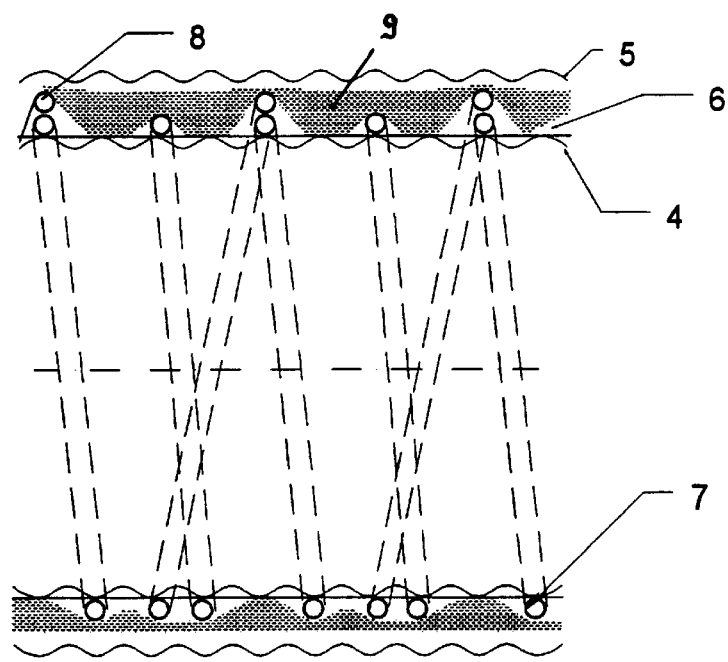

FIG. 2 shows a lateral section through the line pipe claimed by the invention, which is used as a connecting line 3 in an application of the type illustrated in FIG. 1.

The line pipe consists of an inner tube 4 and an outer tube 5 that is oriented concentric to the inner tube 4. Six designates the ring-shaped gap between the tubes 4 and 5. An outer jacket (not shown) made of an abrasion-proof plastic that is resistant to salt water can also be placed over the outer tube 5.

The tubes 4 and 5 are longitudinally welded tubes made of metal, preferably stainless steel, and are provided with a ring-shaped or helical corrugation that makes the tube system flexible. Such tubes can be manufactured in very long lengths, and can be wound up like electrical cable on cable drums and shipped to the location where they will be used. The distance between the tubes 4 and 5 is maintained by a spacer that consists of a first cord 7 that is wrapped around the inner tube 4, and a second cord 8 that is wrapped in the opposite direction on top of the inner cord 7. The cords 7 and 8 are preferably round cords made of fiber-reinforced polyester. The first cord 7 is wrapped with a relatively short lay. The second cord 8 is wrapped with a longer lay than the first cord 7. Because there are few intersection points between the cords 7 and 8, the amount of heat conducted between the tubes 4 and 5 is extremely small. Because the cords 7 and 8 are round cords, the contact between the cords is only in the form of spot contact.

The space between the tubes 4 and 5 and the turns of the cords 7 and 8 is filled up to approximately 90% with a plurality of layers of strips 9 made of fleece material. Fleece material has an inherently low coefficient of thermal conductivity. Convection is also prevented because the ring-shaped gap is almost entirely occupied by the fleece material.

When the line pipe is in use, the ring-shaped gap contains a vacuum from $10^{-1}$ to $10^{-3}$ mbar. The vacuum can be produced, e.g., at the factory, i.e., by creating a pressure-tight seal on both ends of a length of tube and connecting the line pipe to the fittings that are attached to the vessels 1 and 2 at the site where the line pipe is to be used. Alternatively, the lengths of pipe can be transported to the site individually, where the individual segments are connected and the evacuation process is then carried out.

Because the line pipe is lighter than seawater, even when it is filled with natural gas, weighting elements can be attached to the line pipe in a manner not illustrated so that the line pipe connects the vessels 1 and 2 in the form of a catenary curve.

The dimensions for a line pipe as taught by the invention can be as follows, for example:

| | |
|---|---|
| Outside diameter of the outer tube | 298 mm |
| Inside diameter of the outer tube | 264 mm |
| Outside diameter of the inner tube | 220 mm |
| Inside diameter of the inner tube | 198 mm |
| Diameter of the cords | 8 mm |
| Lay of the inner cord | 100 mm |
| Lay of the outer cord | 200 mm |
| Wall thickness of the outer tube | 1.6 mm |
| Wall thickness of the inner tube | 1.2 mm |

What is claimed is:

1. A flexible line pipe comprising an inner corrugated metal tube, an outer corrugated metal tube located at some distance from the inner tube and a spacer as well as an insulation material between the inner and the outer metal tubes, whereby a pressure that is less than atmospheric pressure prevails in the ring-shaped gap between the tubes, wherein:

said spacer comprises two cords (7, 8) made of fiber-reinforced plastic wrapped around said inner tube (4) in opposite directions of winding;

said insulation material is a fleece material; and said pressure is between $10^{-3}$ and $10^{-1}$ mbar; and wherein the two cords have a round cross section.

2. A flexible line pipe as claimed in claim 1, wherein both the inner tube (4) and the outer tube (5) are made of stainless steel.

3. A flexible line pipe as claimed in claim 1, wherein the cords (7, 8) comprise fiberglass-reinforced plastic, preferably fiberglass-reinforced polyester or epoxy.

4. A flexible line pipe as claimed in claim 1, wherein the insulation material (9) comprises strips of fleece wrapped around the inner tube (4).

5. A flexible line pipe as claimed in claim 1, wherein the ring-shaped gap (6) is 70–95% filled with insulation material (9).

6. A flexible line pipe as claimed in claim 1, wherein the gap (6) between the inner tube (4) and the outer tube (5) amounts to between 3 and 10% of the outside diameter of the outer tube (5).

7. A flexible line pipe as claimed in claim 1, wherein the inner cord is wrapped around the inner tube with a lay that equals 3 to 20 times the distance between the inner tube (4) and the outer tube (6).

8. A flexible line pipe as claimed in claim 1, wherein the outer cord (8) is wrapped around the inner tube (4) with a lay that is twice the lay of the inner cord (7).

* * * * *